United States Patent [19]
Hagelberg

[11] 3,974,767
[45] Aug. 17, 1976

[54] PRINTING METHOD AND APPARATUS

[75] Inventor: A. Torvald Sverker Hagelberg, Molnlycke, Sweden

[73] Assignee: Bengt Petersson New Products Investment AB, Goteborg, Sweden

[22] Filed: Nov. 19, 1975

[21] Appl. No.: 633,298

Related U.S. Application Data

[63] Continuation of Ser. No. 444,555, Feb. 21, 1974, abandoned.

[30] Foreign Application Priority Data

Mar. 1, 1973 Sweden .......................... 73028649

[52] U.S. Cl. .............................. 101/151; 101/163; 178/6.6 R; 101/170

[51] Int. Cl.² ...................... B41M 1/10; B41F 3/36; H04N 1/22

[58] Field of Search .......... 101/150, 151, 163, 115, 101/170, DIG. 13; 178/6.6 R

[56] References Cited

UNITED STATES PATENTS

| | | | |
|---|---|---|---|
| 440,750 | 11/1890 | Shinn | 101/151 |
| 1,092,269 | 4/1914 | Kritter | 101/170 |
| 2,246,729 | 6/1941 | Gutberlet | 101/163 |
| 2,247,540 | 7/1941 | Yanes | 101/170 |
| 3,056,384 | 10/1962 | Beale et al. | 101/151 |
| 3,175,488 | 3/1965 | Tillett et al. | 101/115 |
| 3,790,703 | 2/1974 | Carley | 178/6.6 R |
| 3,798,365 | 3/1974 | Browning | 178/6.6 A |

FOREIGN PATENTS OR APPLICATIONS

| | | | |
|---|---|---|---|
| 9,933 | 10/1900 | Norway | 101/151 |

OTHER PUBLICATIONS

Multicolor Contact Printing by Electrophoretically Attracted Inks, D. A. Radousky, vol. 14, No. 2, July 1971, IBM Technical Disclosure Bulletin, pp. 516, 517.

*Primary Examiner*—J. Reed Fisher
*Attorney, Agent, or Firm*—Toren, McGeady and Stanger

[57] ABSTRACT

In a printing method usable for color printing as well as printing in black and white, a printing form is utilized, comprising a multiple of separate channels each terminating in an orifice in a surface, used as printing surface, which orifice is arranged to form a neutral screen pattern, i.e. a screen pattern which has no connection to the figuration of the intended prints. The printing form for printing by charging the channels with printing ink columns for each channel selected to correspond to the desired nuance of the corresponding point of an original to be reproduced. The ink is charged in amounts sufficient to be successively distributed in the form of a coating to the surface of a multiple, preferable the whole intended edition of the objects or copies to be produced. In printing, the object to be printed, for example a paper sheet, is pressed against the printing surface of the form and the ink columns are subjected to a pressure which will press them in to contact with the object leaving a coating on the same. This coating will correspond to the selected nuance of the ink in the different channels and every type of picture can be produced. The charging of the channels of the printing form is carried out automatically by means of an apparatus in which the original intended to be reproduced is optically scanned so that an electric signal is produced which is transmitted to an ink injection device provided to inject printing ink into the separate channels in the printing form to correspond to the original scanned. Prior to injection the ink is mixed to a nuance corresponding to the original by means of the signal which is provided to govern the injection device.

3 Claims, 8 Drawing Figures

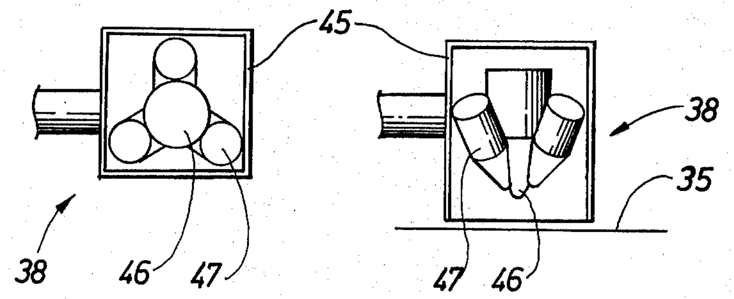
FIG.4
FIG.5
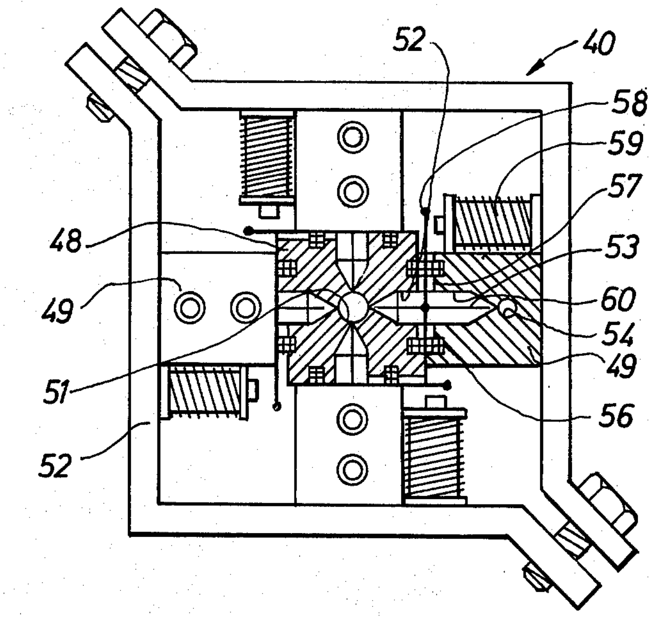
FIG.6

PRINTING METHOD AND APPARATUS

This is a continuation of Application Ser. No. 444,555, now abandoned, filed Feb. 21, 1974.

BACKGROUND OF THE INVENTION

The present invention relates to a printing method and to an apparatus for the realization of the method.

In the prior art a great many different methods of reproduction are known. Of the methods employed each one generally has its own defined range of application with respect to the desired number of copies and the quality of reproduction. For reproductions in black and white there is practically always a method available which can be applied at a reasonable cost for each size of edition and for each quality requirement. However, methods for colour reproduction of relatively high quality and by means of which any type original can be reproduced at a reasonable cost, do not exist for editions ranging from a few dozen to about a thousand copies. Photographic methods, which can be used when the number of copies is very small, are not realistic for economic reasons, when a greater number is involved and certainly not by larger areas. On the other side heavy initial costs will occur in connection with colour prints produced according to conventional printing methods in a printing machine which results in a high price per unit of minor editions and too high production costs for most uses.

SUMMARY OF THE INVENTION

It is an object of the present invention to provide a printing method by means of which prints of all kinds, including colour prints, can be produced at a low unit cost also in case of small editions and by means of inexperienced personnel.

The object of the invention is obtained by means of a method in which a printing form, comprising a multiple of separated channels each terminating in an orifice in the intended printing surface which orifices are arranged to form a neutral screen pattern in said surface, is prepared for printing by charging the channels with printing ink columns for each channel selected to correspond to the desired nuance of the corresponding point of the intended printing object and in an amount sufficient to be successively distributed in the form of a coating to the surface of a multiple of objects intended to be produced, which production is carried out by pressing the intended product against said printing surface and producing a pressure in the mass of ink enclosed into said channels to press the part of the ink columns adjacent to the printing surface in contact with the object thereby producing a print on the same.

BRIEF DESCRIPTION OF THE DRAWINGS

In the accompanying drawings an embodiment of the invention is illustrated, in which FIG. 4 is a top view of a detail of the apparatus of FIG. 3, FIG. 5 is a side elevational view of the same detail, FIG. 6 is a horizontal cross section of another detail of the apparatus of FIG. 2.

DETAILED DESCRIPTION OF THE INVENTION

Figure 1:
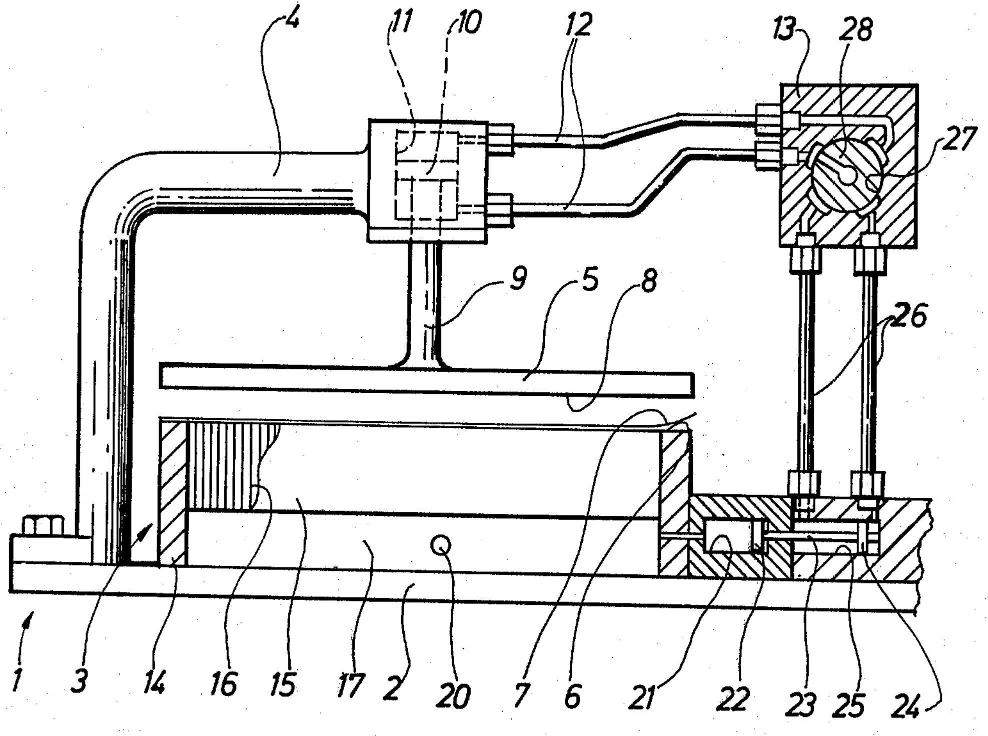
FIG. 1 is a partly broken side elevational view of the printing machine.

The printing press illustrated in FIG. 1 comprises a frame 1 with a supporting table 2 for a printing form 3 and a supporting arm 4 for a vertically displaceable press plate 5. The printing form 3 shows a printing surface 6 on which the sheet 7 to be printed shall be placed, opposite to the printing surface 6. The press plate 5 exhibits a corresponding press surface 8. The press plate 5 is supported by a piston rod 9, the piston 10 of which slides in a cylinder 11 of the supporting arm 4. Above and below the piston 10 a cylinder provides chambers, which by means of the conduits 12 are in connection with a distribution valve 13.

The printing form 3 has a frame 14, which surrounds a thick plate 15, through which channels 16 separated by walls extend, said channels at one end each terminate in an orifice in the printing surface 6 while at the other end another orifice debouches into a hollow chamber 17, defined by the surface of the table 2, the frame 14, and the lower surface of the plate 15. The walls of the channels are so thin and so closely located that the orifices of the channels 16 form a dense screen pattern, the fineness of which is determined by the desired fineness of the screen pattern of the print.

Figure 2:
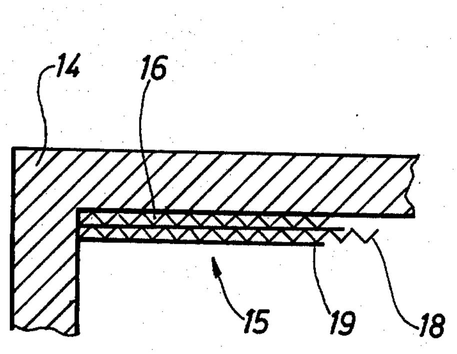
FIG. 2 illustrates a detail of FIG. 1 in a larger scale.

FIG. 2 illustrates how the channels can be designed from a production technical viewpoint. According to the figure the frame 14 surrounds a great number of metal sheets, for one part pleated sheets 18 and for another part plane sheets 19. Every other sheet is plane alternating with a pleated sheet, and the two types of sheets are joined together along the line described by the angle points of the sheets 18 for example by means of soldering.

The chamber 17 is connected with the surrounding atmosphere by means of a check valve 20, which is arranged in such a way that no air can pass out through the same, but it permits air to pass in, but very slowly. In addition a cylinder 21 with a piston 22 is connected with the chamber 17, said piston 22 by means of a piston rod 23 being connected with a piston 24 of a cylinder 25. In front of and behind the piston 24 cylinder chambers are shaped, which by means of conduits 26 are in connection with the distribution valve 13. The four conduits 12, 26 debouching in the distribution valve 13 via channels of evenly distributed location connect to a cylindrical chamber 27 of a rotatable valve body 28. The valve body 28 exhibits a central bore connected with a source of compressed air, said bore by means of a radial bore being connected with the channels 12, 26 by pivoting of the valve body.

It should be mentioned that the press plate 5 can be substituted by a printing form similar to the printing form 3 with its printing surface 6 pointing downwards and connected with the cylinder system 21 – 25 or a separate cylinder system, and also connected with the distribution valve 13. By this arrangement both sides of the printing sheet 7 can be printed simultaneously. The alternative change in question, however, does not signify any change in the basic function.

It should also be added that the printing surface does not necessarily have to be plane, as by suitable shaping or milling of the plate 15 it can be given a threedimensional shape, adapted for example to a three dimensional plastic object intended to be provided with a decoration. If in this connection the press is provided with both an upper and a lower printing form, the printing surfaces of which can be designed to shape a hollow chamber, which completely surrounds the object in question.

At the start of the printing cycle the position is the one illustrated in FIG. 1. The press plate 5 thus is raised from the printing surface 6 by means of pressurized air against the underside of the piston 10. The piston 22 is in its outer position, which consequently also is the case with the piston 24. The channels 16 are filled with printing ink, which in each one of the channels is of the colour and degree of paleness which corresponds to the same in the original to be reproduced. In principle all channels shall be filled within the limits of the area to be printed, white portions therefore being corresponded by channels containing white ink. The different colours are suitably obtained in the same manner as in connection with conventional colour printing by mixture of three colours selected so they are evenly distributed in the colour circle. The desired paleness is provided by adjusting the admixture of the white ink. Thus, black is obtained by mixing equal parts of the three basic colours without any admixture of white. However, in certain cases it can be suitable to resort to a five-colour system, in addition to the three basic colours plus white also comprising black colour.

Given the conditions mentioned the printing cycle is started by turning the valve body 28 90°, so that the piston 10 is actuated by compressed air against its top side at the same time as the pressure on its underside is relieved in a manner not shown but in itself known. As a result the pressure plate 5 descends and presses the printing sheet 7 against the printing surface 6. The next step is a further 90° turn of the valve body 28, whereby the pressure plate 5 maintains its pressure. The outside of the piston 24 is thereby subjected to pressure and it is pushed forwards, which is also the case with the piston 22, resulting in air being pressed into the chamber 17, so that the pressure inside the same is increased. This leads to the ink columns in the channels 16 being pressed upwards against the underside of the printing sheet 7, and a thin layer of ink is deposited thereon. Then the valve body 28 is rotated still another quarter of a revolution causing a retraction of the pistons 24, 22 whereby the pressure in the chamber 17 diminishes as well as the pressure in the ink columns of the channels 16. Now the valve body 28 can be brought back to the starting position, so that the press plate 5 is lifted and the printing sheet 7 can be removed. By a slow influx of air through the valve 20 the pressure in the chamber 17 slowly reaches the atmospheric pressure, and the whole press is ready for a new printing cycle.

Thus it is possible to produce complete colour prints in one single printing operation by means of the printing press described without separate printing of the individual colours. It is even possible to print sheets on both sides simultaneously and to print three dimensional objects. If the printing form 3 is provided with heating means, further printing ink can be used, which solidifies at room temperature and thus does not have to contain any solvent. The printing operation then takes place with the ink heated to above its melting point.

However, one can immediately perceive that in order to realize the printing operation described, facilities to prepare the printing form are required, so that its channels will receive a mixture of inks selected in accordance with any desired original. A description of the design of an apparatus for the preparation of printing forms will now follow, reference being made to FIGS. 3 – 8.

Figure 3:
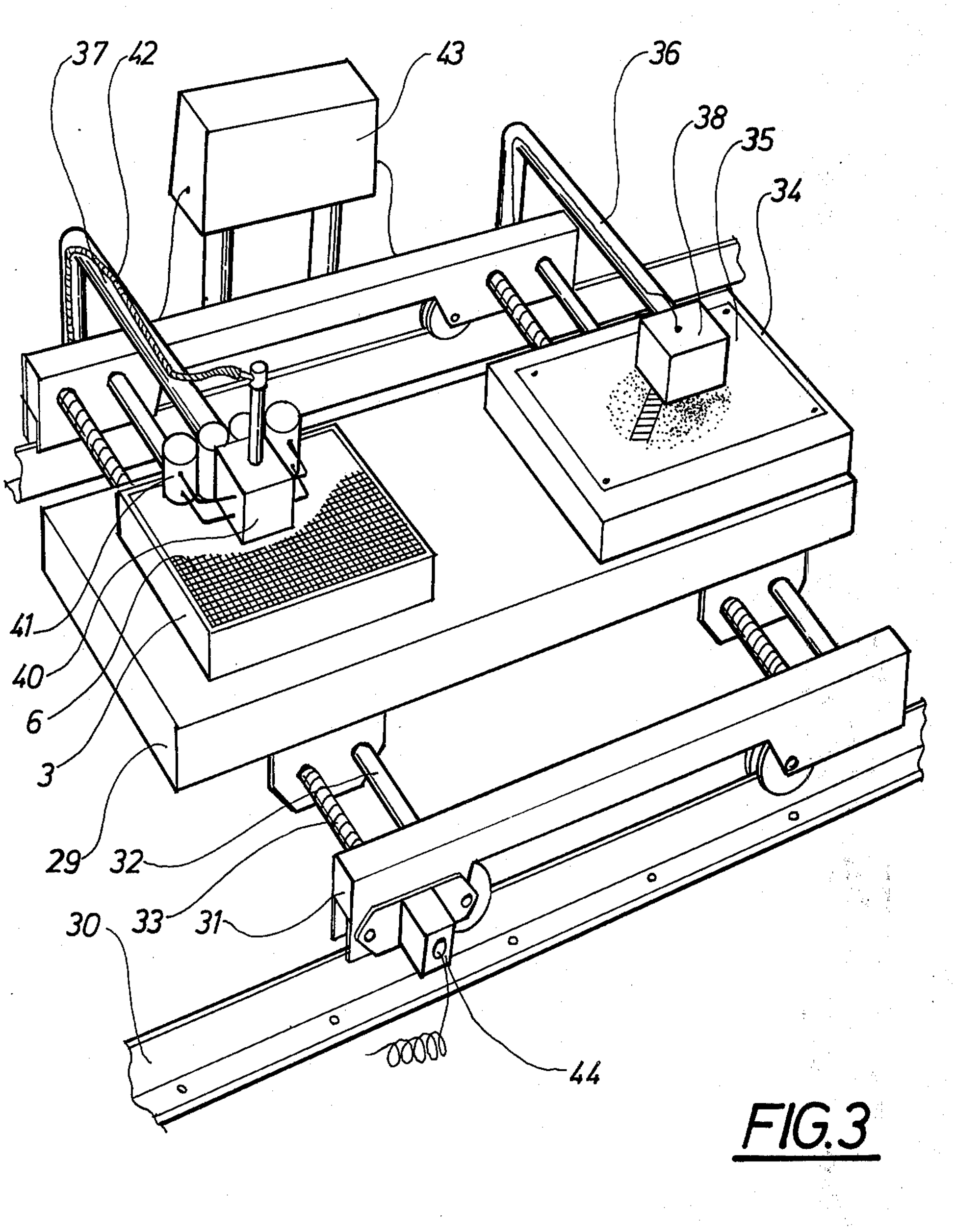
FIG. 3 is a perspective view of an apparatus for the preparation of the printing device.

From FIG. 3 it is evident that the apparatus provides a table 29 which by means of a carriage 31 displaceable on a rail 30 and sliding bars 32 and screws 33 is movable in a coordinate system, represented by the rows of orifices of the channels 16 of a printing form 3, which is placed on the table 29. The table 29 in addition supports a plate 34 for an original 35, intended to be reproduced. In fixed position above the table 29 a photocell equipment 38 for the registering of colours and a device 40 for the preparation of the printing form 3 with ink and provided with at least four ink receptacles 41 respectively are supported by means of arms 36 and 37. By means of a conduit 42 the device 40 is connected with a pressurized air supply, and the photocell equipment 38 and the device 40 are electrically interconnected via an electronic control apparatus 43, to which also a motorized equipment 44 coupled to the wheels of the carriage 31 for the displacement of the table 29 in the coordinate system mentioned is connected.

In FIG. 4 the photocell equipment 38 is shown from above, and in FIG. 5 in side elevation, concealing parts of a housing 45 thereof being removed. An illumination source 46 is located in central position in the housing 45 in order to provide a point shaped field of illumination on the underlying original 35, the surface of which approximately corresponds the surface of the orifice of a channel 16 of the printing form 3. Three photocell devices 47 are symmetrically located around the source of illumination 46, the indicator openings of said devices being directed towards the bright spot produced by the source of illumination 46, said photocell devices being equipped with colour filters in known manner adapted to permit each individual photocell to react to the intensity of one of the selected basic colours only.

The ink preparation device 40 is illustrated in FIG. 6. It comprises a central housing 48 and four identically shaped lateral housings 49 with the five housings surrounded by a clamping device 50, the two halves of which can be fastened to each other by screws. The central housing 48 provides a centrally located bore 51, which is vertical in the intended working position. Four symmetrically distributed pointed bores 52 are connected to the bore 51 in radial arrangement, the pointed portion of the last mentioned bores 52 terminating with small valve seats at the entrances into the central bore 51. In the opposing lateral housing 49 each bore 52 is corresponded by an opposite similar bore 53, which via a second valve seat debouches in a bottom bore 54. According to FIG. 7 a bore 55 connects to the hollow chamber shaped by the bores 52, 53. Round the common axis of the bores 52, 53 extends a gasket 56, and a channel 57 is provided in the contact surface between the central housing 48 and each one of the lateral housings 49. In the channel 57 there is a bar 58, at the outer end of which an electromagnet 59 is placed, the inner end of said bar terminating in central position in the hollow chamber 52, 53 and supporting a double-ended valve needle 60 arranged to cooperate with the two valve seats mentioned above.

Figure 7:
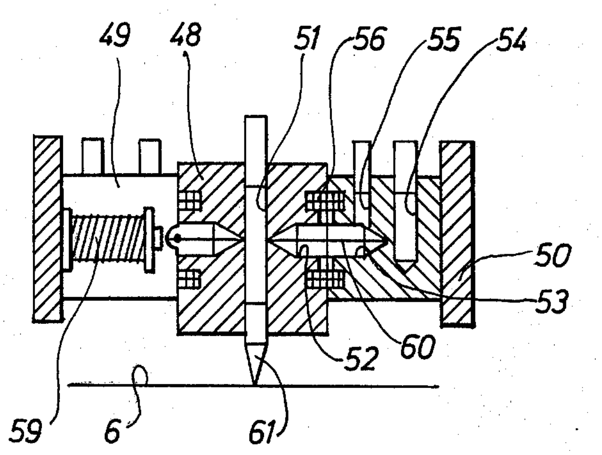
FIG. 7 is a view of a vertical cross section of the same detail, and FIG. 8 finally illustrates a wiring diagram for the apparatus of FIG. 2.

In FIG. 7 it is shown how the central bore 51 at its lower end is terminated into a pointed nozzle 61, the orifice of which shall be located closely above the printing surface 6 of the form 3. All of the bores 51, 54 and 55 are provided with nipple connections to conduits. By means of said nipples the bore 51 shall be connected with a source of pressurized air, and the four bores 55 each with an ink receptacle, in which the ink is subjected to pressure. The bore 54 shall be connected with a return conduit, which via a relief device terminates either in the same ink receptacle as the one to which the corresponding bore 55 is connected or in a special receptacle for return flow. Each one of the pair of bores 54, 55 is connected with one of the three basic colours and a system for white colour respectively. In case the earlier mentioned thermoplastic ink is used, some kind of heating device is required in connection with the ink preparing device.

Figure 8:
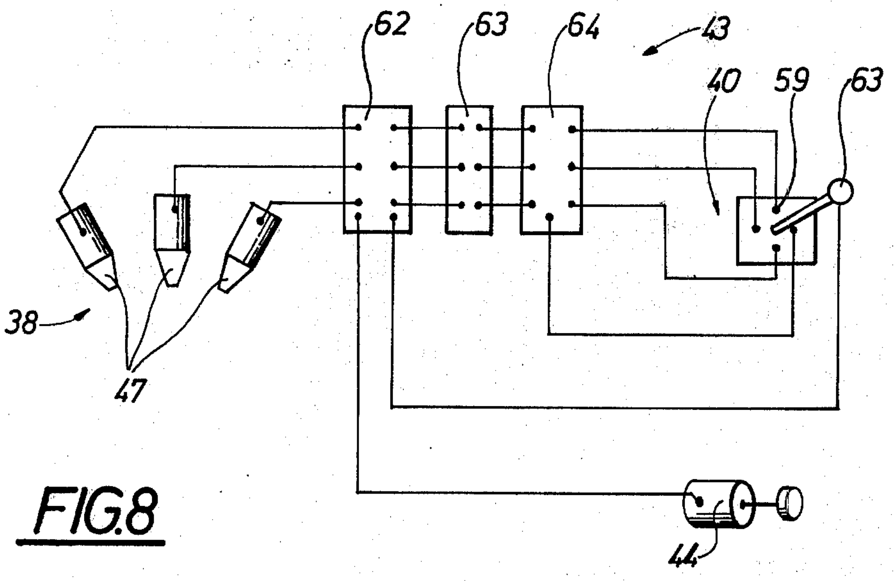

The four magnetic coils 59 are connected with the electric control device 43, see FIG. 8, as well as the photocells 47 and the driving unit 44 for the table 29.

As an electronic control system can be designed in so many different ways and its assembly often can take place availing oneself of standard components obtainable in the trade, only a rough description of the functional design of the control system will be mentioned, reference being made to the block diagram in FIG. 8. According to FIG. 8 the three photocells 47 arranged for selective take up each of one basic colour is connected to a detector 62. The detector 62 is arranged to register the frequency in which the registering values are changed during the displacement of the original past the source of illumination 46, the surface of illumination of which is registered by the photocells 47. This frequency provides a control of the driving unit 44, so that within certain limits the frequency of the changes of registration is kept unchanged and at such a value that the valves of the ink preparing device manage to keep pace with the changes. When scanning the portions of a completely even shade, the speed must of course be limited to a maximum permissible level. In connection with very sharply defined portions of the original, by way of example such ones indicated with dots and dashes, the detector 62 must be designed to provide a stepwise displacement of the carriage 29 with the step corresponding to the distance between adjacent orifices of the printing form.

The pulses from the three photocells 47 are conducted to a delaying device 63, which is designed to provide a time interval between the control of the driving unit 44 and the control of the ink preparing device 40, as the carriage logically can be assumed to have a considerably greater inertia than the valves of the ink preparing device 40.

The now delayed pulses from the three photocells 47 are thereafter conducted to a summing up device 64. This device emits four signal flows, three of them to the magnetic coils 59 provided for the control of the three basic colours, and one for the magnetic coil 59 provided for the control of the white colour. In operation the control signals are adjusted in such a manner that during the whole time a total ink flow is delivered, which is unchanged relative to the volume per displacement unit, the flow of white ink is adjusted according to the paleness and the remainder of the flow is apportioned between the three basic colours according to the registering values of the photocells 47.

By means of the supply of pressurized air in the bore 51 the pressure after the control valves can be increased, and the transportation velocity of ink in the bore 51 can be increased, so that a slip in the ink preparing process will not occur. When portions of the original exhibit very quick changes, the detector, as already mentioned, can be designed for stepwise displacement of the carriage 31, and in this case the ink supply must take place intermittently, so that by means of the pressurized air the bore 51 for each step is purged and only the adequate mixture of ink for the respective step is fed into the corresponding channel. In such a case the compressed air tube can be provided with a control valve 65 connected to the control system 43.

From the foregoing it should be evident how the table 29 is displaced according to a coordinate system, so that portions of the original 35 and the form 3, which correspond with each other, will pass below the photocell equipment 38 and the ink preparing device 40. It has also been described how the photocell device can be brought to control the displacement of the table 29 as well as the voltage of the magnetic coils 59. Therefore it only remains to explain, how the valves according to FIG. 6 function.

The bar 58 extending through the gasket 56 is arranged by a rocking movement in the fairly soft gasket material to move back and through. As a result the valve body 60 will either bear against the valve seat of the bore 54 or against the valve seat of the bore 51 or occupy some position in between. Which one of the positions taken depends upon the voltage through the magnetic coil 59, which tends to attract the bar 58 when it is passed by the electric current. In the chamber 52, 53 there is ink under pressure, and according to the position of the valve body 60 said ink will flow out through the bore 51, the bore 54 or out into both of the bores in proportions, which are determined by the voltage supply to the magnetic coil 59. The reason, why two valve seats and one return bore have been arranged, is due to a better accuracy of the control by such arrangement being obtained, as any ramming effect by the liquid will not appear, when the valve body 60 is closed. As a matter of fact a valve seat always permits a by-pass flow so that the volume supplied will be removed.

When preparing a printing form with a curved printing surface the pointed nozzle suitably is moved along the rear surface of the form, which can be kept plane or be given a cylindrical or spherical curvature, along which the pointed nozzle 61 easily can be guided. A preparation from the rear side is moreover advantageous in so far as any mirror inversion does not need to be made, and it is a preferred manner also in connection with flat printing.

It should also be mentioned that the preparation can be made via tape recording of the signals of the photocell device, which offers the possibility of editing and mixing and also simple production of the printing form.

I claim:

1. A printing method for the reproduction of multiple copies of a multi-colored original using a printing form having a printing surface divided into a neutral screen pattern with each division of the screen pattern having an orifice connected to a channel extending from the printing surface and with each of the channels having a volume capable of storing a quantity of ink sufficient to reproduce a multiple number of copies of the original, wherein the method comprises the steps of scanning the original to be reproduced by directing an illumination source against a selected area of the original corresponding to a division of the screen pattern of the printing surface and using colored filter photocells directed at the illuminated selected area of the original for determining the color in the selected area, transmitting a signal based on the color scanned to a blending apparatus and blending ink from at least three colors of ink which blended ink has a color similar to the color scanned, injecting a quantity of the blended ink sufficient to reproduce multiple copies of the selected area into the channel in the screen pattern corresponding to the selected area of the original scanned, repeating the scanning, blending, and injecting steps for selected areas until the entire original has been scanned and the corresponding channels opening to the screen pattern of the printing surface have been injected with the blended ink, moving the printing surface into a printing position, placing an individual product to be printed in contact with the printing surface, introducing pressurized air into each of the channels for forcing the ink in each of the channels through the orifice in the printed surface onto the surface of the product to be printed so that a layer of printing ink is deposited on the product providing a reproduction of the original, removing the printed product and repeating the printing operation for a multiple number of the products.

2. A printing apparatus comprising a printing form having a printing surface defining a neutral screen pattern having a multiplicity of divisions, a multiplicity of orifices opening to the printing surface with each orifice opening to one of the divisions of the neutral screen pattern, partition means within said printing form dividing it into a multiplicity of channels with each channel terminating in a corresponding one of said orifices, said printing form defining a chamber opening to the opposite end of each of said channels from said orifices, air pressure source means connected to the chamber in said printing form for supplying pressurized air into the chamber for communication with the opposite ends of each of the channels, a scanning means including an illumination source and a plurality of colored filter photocells for scanning selected areas of an original corresponding to a division of the screen pattern of said printing surface, signal means connected to said photocells for receiving a signal based on the color of the original scanned, ink blending means arranged to blend the color of ink from at least three different colored inks, said signal means connected to said blending means for blending an ink color corresponding to the color of the selected area scanned, conduit means connected to said ink blending means for supplying the blended ink to the channel in said printing form corresponding to the selected area of the original, and pressing means for forcing a product to be printed against said printing surface so that by supplying pressurized air into said chamber in said printing form ink in the channels is forced through the corresponding orifices in the printing surface in a sufficient amount to effect a reproduction of the original on the product.

3. An apparatus for printing sheets comprising a printing form having a frame and a printing surface, a press plate movable toward and away from said printing surface for pressing and releasing the pressure of a sheet placed on the printing surface, said printing form comprising a plate mounted within said frame and comprising a series of channels for storing ink, each of said channels terminating in an orifice that forms part of the printing surface, pneumatic control means for moving said press plate toward the printing form for injecting pressurized air into the interior of said printing form to eject the ink in said channels onto the sheet to be printed, for releasing the pressure in said printing form, and for releasing the pressure on said sheet by moving the press plate away from said printing surface, said control means comprises a first piston-cylinder arrangement operatively connected to said press plate, a second piston-cylinder arrangement comprising a first cylinder and a second cylinder, a first piston mounted for reciprocating movement in said first cylinder, a second piston mounted for reciprocating movement in said second cylinder, and a piston rod having one end connected to said first piston and the other end connected to said second piston, said first cylinder having an opening in one wall thereof that cooperates with the interior of said printing form, a rotatable valve connected to a source of compressed air that alternately connects the compressed air with said first and second piston-cylinder arrangements, and conduit means for connecting said rotatable valve with each of said first and second piston-cylinder arrangements.

* * * * *